March 7, 1950  M. GEISHEIMER  2,499,821
SUPPORT FOR FISHING RODS
Filed Jan. 5, 1946
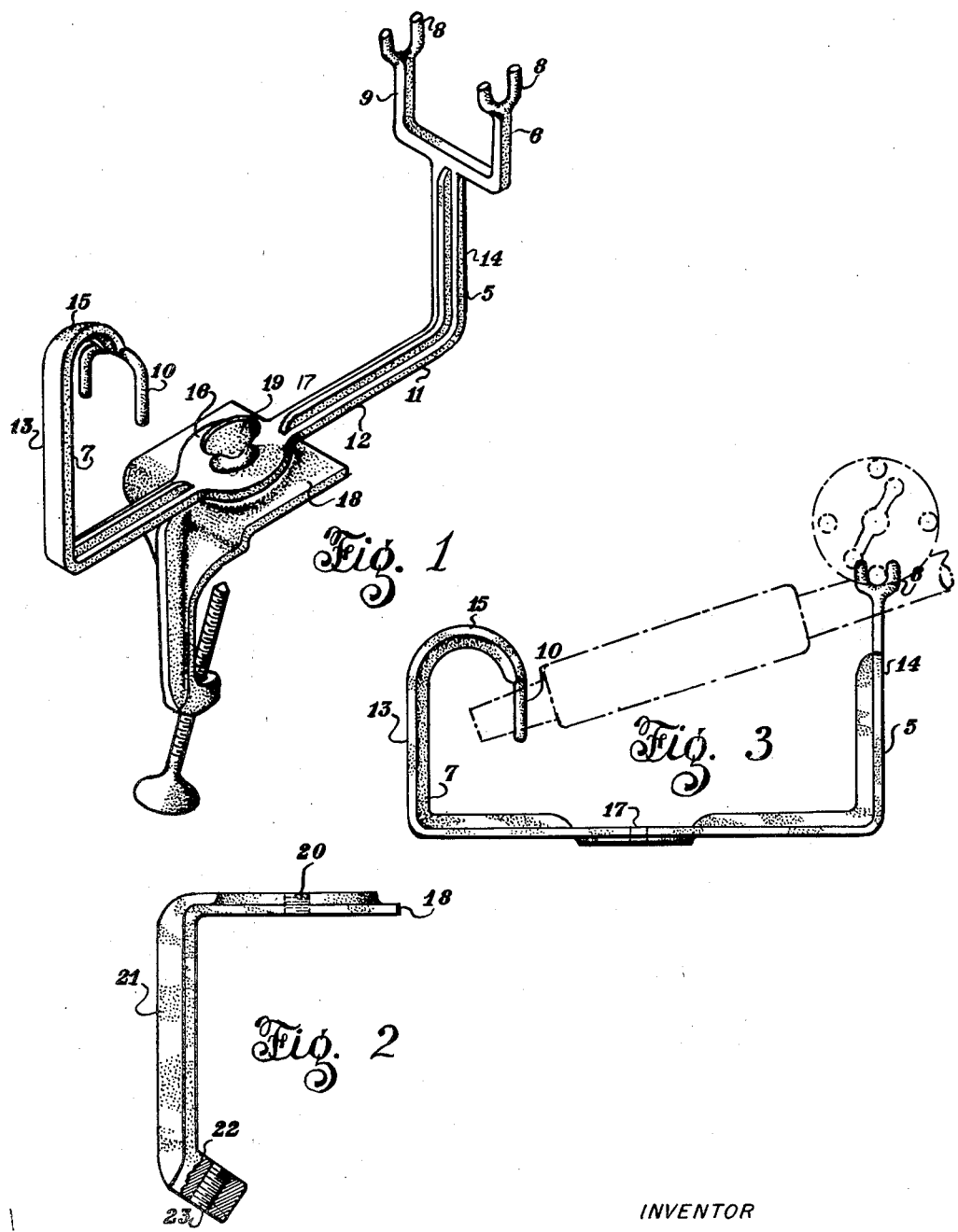
INVENTOR
Martin Geisheimer
BY Joshua R. H. Potts
ATTORNEY Patented Mar. 7, 1950

2,499,821

UNITED STATES PATENT OFFICE 2,499,821

SUPPORT FOR FISHING RODS

Martin Geisheimer, Chicago, Ill.

Application January 5, 1946, Serial No. 639,218

5 Claims. (Cl. 43—21.2)

This invention relates to improvements in fishing devices.

One of the objects of the invention is to provide a fishing rod and reel holder, which will make it unnecessary for the user to hold the rod at all while trolling, for example.

According to my invention, the advantage provided for supporting a fishing rod and its reel at one point and the end of the rod at another point, to keep the fishing rod in a stationary position.

I have, for example, provided a support for the rod where the reel is located, so that the cross piece of the reel may sit on the support, and the usual curved flange at the same time will be engaged by the pole, just the same as usual, notwithstanding.

By my arrangement, the support for the fishing rod may be adjusted to provide for supporting the pole from the side of the boat or from the back of the boat, and in other positions.

Another object has been to make such a device simple in form and relatively low in cost.

Further objects and advantages will appear and be brought out more fully in the following specification, reference being had to the accompanying drawing, in which:

Fig. 1 is a perspective view of the device.

Fig. 2 is an elevation of one of the fastening elements.

Fig. 3 is an elevation of the rod-holding means.

In the device which I have selected for illustrating the principle of my invention, I have shown a rod-holder 5, including a reel-holding element 6, and a rod-holding element 7.

The reel-holding element is comprised of a pair of upwardly-turned U-shaped members 8, for supporting the cross-piece of the reel, which may sit in the U-shaped members.

The U-shaped members 8 may be connected in any suitable manner, as, for example, by an integral connecting link 9.

The rod-holding element 7 may consist of a downwardly-turned U-shaped member 10, under which the end of a fishing rod may be located, so that the end of the fishing rod may bear upwardly against the U-shaped member 10, so as to automatically hold the fishing rod in place, as will hereinafter more fully appear.

The fishing rod holding element may be supported by an integrally-formed link 11, having a horizontal bend 12, a vertical bend 13, and a second vertical bend 14.

The vertical bend 13 may have a curved upper portion 15, which may immediately support the downwardly-turned U-shaped member 10.

The vertically-bent member 14 is adapted to support the link 9 in any suitable manner.

As a matter of fact, the device may preferably be made in the form of an integral piece of stout wire, bent in the ways mentioned, or in equivalent manner, with the U-shaped members provided thereupon, either by splitting the wire or in any other suitable manner.

The rod holder 5 may have an extended central bearing portion 16, having an opening 17, by which the rod holder may be fastened in place to a fastening device, having a plate 18, by means of a wing nut 19, extending through the opening 17, and an opening 20 in the plate 18.

The plate may be integrally formed with a downwardly depending portion 21, having a bent end 22, with a threaded opening 23, into which a wing nut is adapted to thread.

By the foregoing means, it is possible to fasten the above device so that the rod may point off the back of the boat or to the side of the boat, or in any other manner.

For the back of the boat the plate 18 may be rested on top of the back seat, the rod holder may be swiveled in the desired direction, and the wing nut may be screwed in place against the under side of the seat, as will be obvious.

For the side of the boat, the rod holder may be fastened in a similar manner in any desired direction, as will be readily understood by fishermen and others, without further explanation.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. In a fishing rod support, a bracket in the form of a C clamp with a holding screw in one end, a base yoke pivotally mounted on the bracket, a reel holding yoke with upwardly extending arms at one end of the base yoke, and a rod holding yoke with downwardly extending arms at the opposite end of the base yoke, said rod holding yoke being of U-shape with the bend of the U connected to said base yoke leaving the ends of the arms of the U free and unobstructed to permit of positioning or removal of a rod from either side thereof, the extreme ends of the arms of the reel holding yoke being forked to receive a cross rod of a reel.

2. A fishing rod support device comprising a base, a reel holding yoke, and a rod holding yoke mounted thereon, said reel holding yoke having upwardly extending arms and said rod holding yoke being of U-shape and having downwardly extending arms joined by a bend, said bend being joined to said base leaving the ends of the arms free and unobstructed to permit of positioning and removal of a rod from either side, the extreme ends of the arms of the reel holding yoke being forked to receive a cross rod of a reel.

3. A fishing rod support device comprising a base, a reel holding yoke, and a rod holding yoke mounted thereon, said reel holding yoke having upwardly extending U-shaped arms and said rod holding yoke being of U-shape and having downwardly extending arms joined by a bend, said bend being joined to said base leaving the ends of the arms free and unobstructed to permit of positioning and removal of a rod from either side, the extreme ends of the arms of the reel holding yoke being U-shaped to receive a cross rod of a reel.

4. A fishing rod support device consisting of a base, a reel holding yoke, and a rod holding yoke mounted thereon, said reel holding yoke having upwardly extending U-shaped arms and said rod holding yoke having downwardly extending arms the ends of which are free and unobstructed to permit of positioning and removal of a rod from either side, the extreme ends of the arms of the reel holding yoke being U-shaped to receive a cross rod of a reel.

5. In a fishing rod support, a bracket in the form of a C-clamp with a holding screw in one end, a base yoke pivotally mounted on the bracket, a rod holding yoke of U-shape providing downwardly extending arms having free ends at one end of the base yoke and a reel holding yoke at the other end of said base yoke consisting of two U-shaped members, supported parallel to each other and adapted to receive a cross rod of a reel, said reel holding yoke extending to a greater height than said rod holding yoke.

MARTIN GEISHEIMER.

REFERENCES CITED

The following references are of record in the file of this patent:

UNITED STATES PATENTS

| Number | Name | Date |
|---|---|---|
| 1,025,657 | Towne | May 7, 1912 |
| 2,249,302 | Smith | July 15, 1941 |
| 2,309,350 | Nanasko | Jan. 26, 1943 |
| 2,314,747 | White | Mar. 23, 1943 |